US008040387B2

(12) United States Patent
Kuniba

(10) Patent No.: US 8,040,387 B2
(45) Date of Patent: Oct. 18, 2011

(54) IMAGE PROCESSING APPARATUS, IMAGE PROCESSING PROGRAM, IMAGE PROCESSING METHOD, AND ELECTRONIC CAMERA FOR CORRECTING TEXTURE OF IMAGE

(75) Inventor: Hideyasu Kuniba, Tokyo (JP)

(73) Assignee: Nikon Corporation, Tokyo (JP)

( * ) Notice: Subject to any disclaimer, the term of this patent is extended or adjusted under 35 U.S.C. 154(b) by 571 days.

(21) Appl. No.: 12/216,883

(22) Filed: Jul. 11, 2008

(65) Prior Publication Data
US 2009/0046166 A1 Feb. 19, 2009

Related U.S. Application Data

(63) Continuation of application No. PCT/JP2007/000126, filed on Feb. 26, 2007.

(30) Foreign Application Priority Data

Feb. 27, 2006 (JP) ................................. 2006-050221

(51) Int. Cl.
*H04N 5/228* (2006.01)
(52) U.S. Cl. .................... 348/222.1; 348/223.1; 348/241
(58) Field of Classification Search ............... 348/222.1, 348/223.1, 241; 382/254
See application file for complete search history.

(56) References Cited

U.S. PATENT DOCUMENTS

| 5,757,976 A | 5/1998 | Shu |
| 5,760,843 A | 6/1998 | Morimura et al. |
| 6,266,102 B1 | 7/2001 | Azuma et al. |
| 6,373,992 B1 | 4/2002 | Nagao |
| 6,667,815 B1 | 12/2003 | Nagao |
| 6,895,124 B1 | 5/2005 | Kira et al. |
| 7,016,549 B1 | 3/2006 | Utagawa |
| 7,382,915 B2 | 6/2008 | Bala et al. |
| 7,778,478 B2 * | 8/2010 | Kuniba ........................ 382/254 |
| 2002/0114513 A1 | 8/2002 | Hirao |
| 2003/0053689 A1 | 3/2003 | Watanabe et al. |
| 2003/0153519 A1 | 8/2003 | Kay et al. |

(Continued)

FOREIGN PATENT DOCUMENTS

JP A-2-36675 2/1990

(Continued)

OTHER PUBLICATIONS

Office Action issued in U.S. Appl. No. 11/629,794 on Aug. 6, 2010.

(Continued)

*Primary Examiner* — Gevell Selby
(74) *Attorney, Agent, or Firm* — Oliff & Berridge, PLC

(57) ABSTRACT

An image processing apparatus includes a brightness fluctuation extraction section, a color difference fluctuation extraction section, a conversion section, and an addition section. The brightness extraction section extracts a local fluctuation component from brightness information (hereinafter, a brightness fluctuation) in the image data. The color difference fluctuation extraction section extracts a local fluctuation component from color difference information (hereinafter, a color difference fluctuation) in the image data. The conversion section weightedly adds the color difference fluctuation and the brightness fluctuation to generate a pseudo texture component. The addition section adds the generated texture component to the brightness information. In the above-described structure, the conversion section adjusts and changes a weighting ratio of the weighted addition so as to make ratios of noises of color components included in the texture component substantially equal.

10 Claims, 4 Drawing Sheets

U.S. PATENT DOCUMENTS

| | | | |
|---|---|---|---|
| 2004/0081366 A1* | 4/2004 | Monobe et al. | 382/261 |
| 2005/0207641 A1 | 9/2005 | Bala et al. | |
| 2007/0165282 A1* | 7/2007 | Sambongi et al. | 358/3.21 |

FOREIGN PATENT DOCUMENTS

| | | |
|---|---|---|
| JP | A-5-76034 | 3/1993 |
| JP | A-6-351036 | 12/1994 |
| JP | A-7-170428 | 7/1995 |
| JP | A-9-154044 | 6/1997 |
| JP | A-10-210324 | 8/1998 |
| JP | A-2001-61157 | 3/2001 |
| JP | A-2001-118064 | 4/2001 |
| JP | A-2001-245178 | 9/2001 |
| JP | A-2002-44678 | 2/2002 |
| JP | A-2002-290772 | 10/2002 |
| JP | A-2005-167896 | 6/2005 |

OTHER PUBLICATIONS

Feb. 4, 2010 Office Action issued in U.S. Appl. No. 11/629,794.

Strickland, R.N., et al., "Digital color image enhancement based on the saturation component," Optical Engineering, vol. 26, pp. 609-616, 1987.

Thomas, B.A., et al., "Color image enhancement using spatially adaptive saturation feedback," Proceedings of IEEE International Conference on Image Processing, pp. 30-33, 1997.

* cited by examiner

IMAGE PROCESSING APPARATUS, IMAGE PROCESSING PROGRAM, IMAGE PROCESSING METHOD, AND ELECTRONIC CAMERA FOR CORRECTING TEXTURE OF IMAGE

CROSS-REFERENCE TO RELATED APPLICATION

This application is a Continuation Application of International Application No. PCT/JP2007/000126, filed Feb. 26, 2007, designating the U.S., in which the International Application claims a priority date of Feb. 27, 2006, based on prior filed Japanese Patent Application No. 2006-050221, the entire contents of which are incorporated herein by reference.

BACKGROUND

1. Field

The present application relates to an image processing apparatus, an image processing program, an image processing method, and an electronic camera.

2. Description of the Related Art

In conventional arts, if an electronic camera is set to high sensitivity (for example, an output gain of an imaging device is raised), noises of a shot image increases, so that the image becomes noisy and noises such as color speckles appear in the image. Such noises can be reduced by smoothing the image. However, excessive smoothing would damage a fine image structure of a subject, resulting in an image with poor texture.

As an apparatus correcting such poor texture, an apparatus of the following patent document 1 has been known.

In the patent document 1 (Japanese Unexamined Patent Application Publication No 2001-118064 (FIG. 5, for instance)), a minute amplitude component is extracted from image data by using an $\epsilon$ filter or the like, and the minute amplitude component is added to the image data. This prior art enables texture correction such as so-called "wrinkle emphasis".

In the prior art of the patent document 1, even a minute amplitude component that should be removed as a noise is also directly added to the image data. This has posed a problem that a surface of a subject appears noisy due to the noise.

SUMMARY

A proposition is to provide an image processing technique for correcting texture of an image while preventing worsening of a noisy impression.

An image processing apparatus includes a brightness fluctuation extraction section, a color difference fluctuation extraction section, a conversion section, and an addition section.

The brightness fluctuation extraction section extracts a local fluctuation component from brightness information (hereinafter, a brightness fluctuation) in the image data.

The color difference fluctuation extraction section extracts a local fluctuation component from color difference information (hereinafter, a color difference fluctuation) in the image data.

The conversion section weightedly adds the color difference fluctuation and the brightness fluctuation to generate a pseudo texture component.

The addition section adds the generated texture component to the brightness information.

In the above-described structure, the conversion section adjusts and changes a weighting ratio of the weighted addition so as to make ratios of noises of color components included in the texture component substantially equal.

In an image processing apparatus, the conversion section obtains, as information, white balance coefficients used when the image data is generated, and calculates the weighting ratio for making the ratios of color noises correlating with the white balance coefficients equal.

In an image processing apparatus, based on local signal levels of color components of the image data, the conversion section locally calculates the weighting ratio for making the ratios of level-dependent color noises included in the texture component equal.

In an image processing apparatus, the conversion section obtains, as information, color correction coefficients of the image data, and calculates the weighting ratio for making the ratios of color noises correlating with the color correction coefficients equal.

In an image processing apparatus, based on a level difference between local color signals of the image data, the conversion section calculates the weighting ratio for making the ratios of color noises correlating with the level difference equal.

In an image processing apparatus, the addition section obtains, as information, a tone correction coefficient of the image data, and changes an addition coefficient of the texture component based on the tone correction coefficient.

An image processing program is a program for causing a computer to function as the image processing apparatus according to any one of the above sections.

An image processing method is a method of applying image processing to image data including brightness information and color difference information, the method including the following operations.

A brightness fluctuation extraction operation . . . To extract a local fluctuation component from the brightness information (hereinafter, a brightness fluctuation) in the image data.

A color difference fluctuation extraction operation . . . To extract a local fluctuation component from the color difference information (hereinafter, a color difference fluctuation) in the image data.

A conversion operation . . . To weightedly add the color difference fluctuation and the brightness fluctuation to generate a pseudo texture component.

An addition operation . . . To add the texture component to the brightness information.

The above conversion operation adjusts and changes a weighting ratio of the weighted addition so as to make ratios of noises of color components included in the texture component substantially equal.

An electronic camera includes the image processing apparatus according to any one of the above sections, and an imaging section picking up an image of a subject to generate image data. In this electronic camera, the image processing apparatus applies image processing to the image data generated by the imaging section.

The local fluctuation of the color difference information is reflected in the texture component of the brightness information, whereby a texture expression of the brightness information is enriched. Further, the weighting ratio for the color difference fluctuation is adjusted and changed to make the ratios of the color noises included in the texture component substantially equal. As a result, it is possible to prevent a noise of a specific color component from mixing in the texture component, which makes it possible to prevent a noise of the brightness information from worsening after the texture correction.

DETAILED DESCRIPTION OF THE EMBODIMENTS

Embodiment (Description of Structure)

Figure 1:
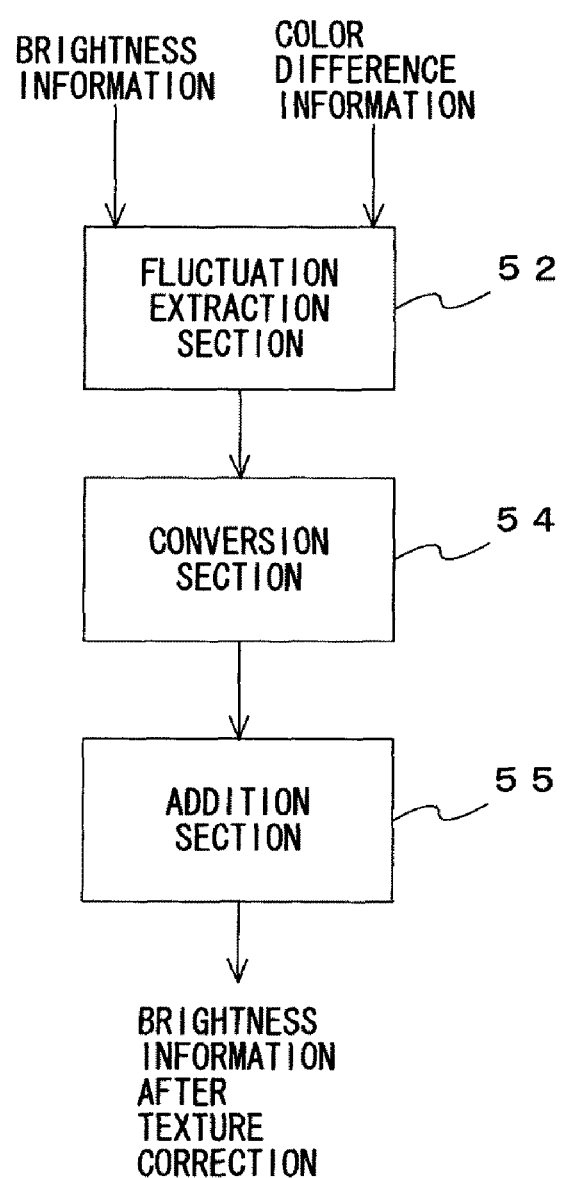
FIG. 1 is a block diagram showing an image processing apparatus 51.

FIG. 1 is a block diagram showing an image processing apparatus 51 of this embodiment.

In FIG. 1, the image processing apparatus 51 includes a fluctuation extraction section 52. The fluctuation extraction section 52 obtains brightness information and color difference information in image data to generate a brightness fluctuation and color difference fluctuations. The conversion section 54 weightedly adds the color difference fluctuations to the brightness fluctuation to generate a pseudo texture component of brightness. An addition section 55 applies texture correction to the brightness information by using the generated texture component.

Incidentally, these constituent elements may be realized as software by a computer executing an image processing program. Alternatively, the above-described constituent elements may be realized as hardware by arithmetic circuits or the like.

(Description of Operation)

Figure 2:
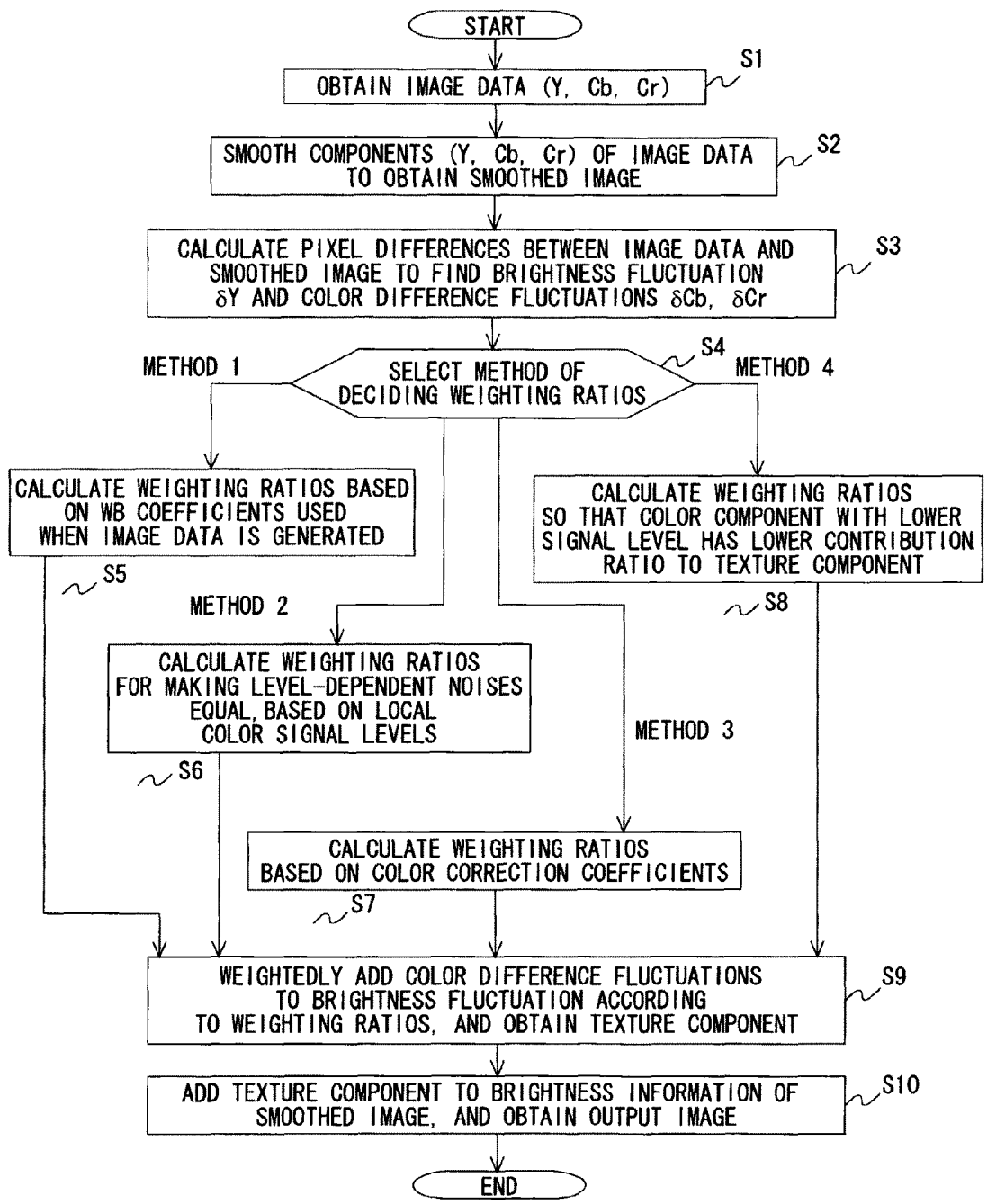
FIG. 2 is a flowchart to explain texture correction processing by the image processing apparatus 51.

FIG. 2 is a flowchart to explain texture correction processing by the image processing apparatus 51.

Hereinafter, the texture correction processing will be described in order of operation numbers shown in FIG. 2.

Figure 3:
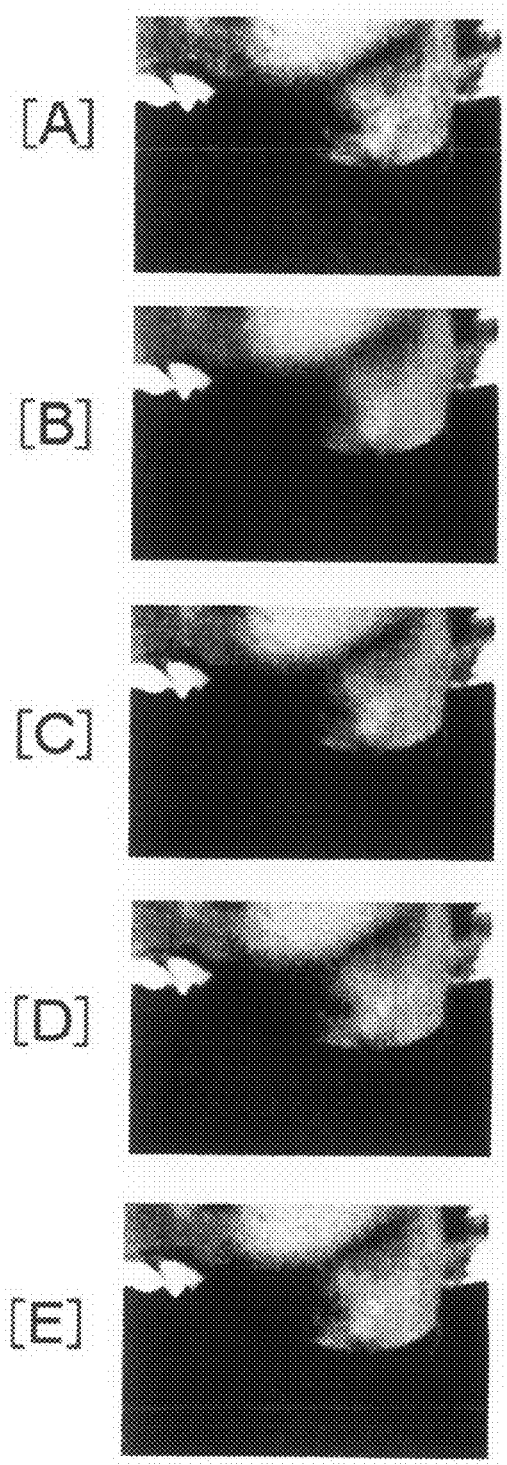
FIG. 3A is an example of the image data as the processing target.
FIG. 3B is view showing an example of the smoothed image.
FIG. 3C and FIG. 3D are images to which texture emphasis are applied.
FIG. 3E is an image resulting from the processing in the first embodiment.

Operation S1: The fluctuation extraction section 52 obtains image data as a processing target. FIG. 3[A] is an example of the image data as the processing target. Each pixel of the image data here has signal components including brightness information Y and color difference information Cb, Cr.

The relation of the signal components YCbCr with color components RGB generated by an electronic camera is expressed by, for example, the following equations.

$$Y = +0.2990R + 0.5780G + 0.1140B$$

$$Cb = -0.1687R - 0.3313G + 0.5000B$$

$$Cr = +0.5000R - 0.4187G - 0.0817B \quad [1]$$

Operation S2: The fluctuation extraction section 52 smoothes each of the brightness information Y and the color difference information Cb, Cr in the image data by using an ε filter or the like to obtain a smoothed image. FIG. 3[B] is a view showing an example of the smoothed image.

Operation S3: The fluctuation extraction section 52 calculates a pixel difference between the brightness information Y in the image data and brightness information having undergone the smoothing to find a local fluctuation of the brightness information, that is, a brightness fluctuation δY. Further, the fluctuation extraction section 52 calculates a pixel difference between the color difference information Cb, Cr in the image data and color difference information having undergone the smoothing to find local fluctuations of the color difference information, that is, color difference fluctuations δCb, δCr.

Operation S4: The conversion section 54 generates a pseudo texture component of brightness by the weighted addition according to the following equation.

$$\text{Texture component } D = \delta Y + \alpha \delta Cb + \beta \delta Cr \quad [2]$$

In preparation for the weighted addition, the conversion section 54 properly decides weighting ratios α, β for the color difference fluctuations. In the image processing apparatus 51, a user can select one of decision methods of Operations S5~S8 as a method for deciding the weighted ratios α, β.

Operation S5: The conversion section 54 obtains, as information, white balance coefficients (a gain Wr of the R component, a gain Wb of the B component) used when the image data is generated, from appended information or the like of the image data.

Generally, an output level ratio of the RGB color components of an imaging device greatly varies depending on light source color temperature of the image data. Here, in general, as a white balance coefficient for a color component is larger, its color signal is output from the imaging device with a smaller level and with a lower S/N. For this reason, it can be inferred that, a noise ratio δR:δG:δB among the color components included in the image data is substantially equal to a white balance coefficient ratio Wr:1:Wb.

$$\delta R : \delta G : \delta B = Wr : 1 : Wb \quad [3]$$

By substituting the equation [1] in the equation [2], the texture component D can be expressed as follows by using the fluctuations δR, δG, δB of the color components.

$$\begin{aligned}\text{Texture component } D &= (-0.1687\alpha + 0.5000\beta + 0.2990)\delta R + \\ &\quad (-0.3313\alpha - 0.4187\beta + 0.5780)\delta G + \\ &\quad (+0.5000\alpha - 0.0817\beta + 0.1140)\delta B \\ &\equiv L\delta R + M\delta G + N\delta B\end{aligned} \quad [4]$$

Here, in order to suppress a conspicuous degree of a noise of a specific color component included in the texture component D, it is preferable that the color noise ratios of the color components included in the texture component D are substantially equal. That is, the weighting ratios α and β are decided so that the equation approximate to the following is obtained.

$$L\delta R : M\delta G : N\delta B = 1:1:1 \quad [5]$$

By combining the conditions of the above equation [3], equation [4], and equation [5], the following simultaneous equations for αβ are obtained, $$(0.3313t1 - 0.1687)\alpha + (0.4187t1 + 0.5)\beta = 0.587t1 - 0.299$$

$$(0.3313t2 + 0.5)\alpha + (0.4187t2 - 0.813)\beta = 0.587t2 - 0.114 \quad [6]$$

where t1=1/Wr and t2=1/Wb.

If the white balance coefficients are Wr=2.0 and Wb=1.47, for instance, the solutions of the equations [6] are α=0.41 and β=0.01. Therefore, by using these solutions α, β themselves or the weighting ratios α, β approximate to these solutions, it is possible to make the ratios of the noises of the color components included in the texture component D substantially equal.

In this manner, the conversion section 54 calculates the solutions of the equations [6] based on the white balance coefficients to decide the weighting ratios α, β. After this decision, the conversion section 54 shifts its operation to Operation S9.

Operation S6: The conversion section 54 inverse-transforms the signal components YCbCr of each pixel of the image data to restore values with which the color components RGB are thought to have generated in the imaging device. By locally smoothing the values of the color components RGB, it is possible to calculate local signal levels of the color components RGB.

Generally, in the imaging device, level-dependent noises such as shot noises occur. Therefore, the ratios of the color noises included in the texture component D also vary depending on the level-dependent noises.

Therefore, based on the local signal levels RGB of the color components RGB, the conversion section 54 calculates the ratio δR:δG:δB of the level-dependent noises of the color components.

For example, if shot noises occur, their noise amounts are proportional to square roots of the local color components RGB generated in the imaging device (generated charge amounts), and therefore, the following relation holds.

$$\delta R:\delta G:\delta B = \sqrt{R}:\sqrt{G}:\sqrt{B} \qquad [7]$$

By using this equation [7] instead of the equation [3] used at Operation S5, the following simultaneous equations for αβ are obtained, $$(0.3313t1-0.1687)\alpha+(0.4187t1+0.5)\beta=0.587t1-0.299$$

$$(0.3313t2+0.5)\alpha+(0.4187t2-0.813)\beta=0.587t2-0.114 \qquad [8]$$

where $t1=\sqrt{(G/R)}$, $t2=\sqrt{(G/B)}$.

Note that lower limit values of the values of R, G, and B are limited so as not to become zero.

The solutions α, β of the equations [8] are weighting ratios for making the ratios of the shot noises of the color components included in the texture component equal.

In this manner, the conversion section 54 decides the weighting ratios α, β for each local area of the image data. After this decision, the conversion section 54 shifts its operation to Operation S9.

Operation S7: The conversion section 54 obtains, as information, color correction coefficients of the image data from appended information or the like of the image data.

For example, as saturation is emphasized more, a larger noise of a specific color component whose saturation is emphasized appears in the image data. In this case, it is inferred that the noise ratio δR:δG:δB among the color components included in the image data is expressed as follows, where Sr, Sg, and Sb are the color correction coefficients of the respective color components RGB.

$$\delta R:\delta G:\delta B = Sr:Sg:Sb \qquad [9]$$

By using the equation [9] instead of the equation [3] used at Operation S5, the following simultaneous equations for αβ are obtained, $$(0.3313t1-0.1687)\alpha+(0.4187t1+0.5)\beta=0.587t1-0.299$$

$$(0.3313t2+0.5)\alpha+(0.4187t2-0.813)\beta=0.587t2-0.114 \qquad [10]$$

where t1=Sg/Sr and t2=Sg/Sb. Note that lower limit values of the values of Sr, Sg, Sb are limited so as not to become zero.

The solutions α, β of the equations [10] are weighting ratios for making changes in the color noise ratios in the texture component D accompanying the saturation correction equal.

In this manner, the conversion section 54 decides the weighting ratios α, β based on the color correction coefficients. After this decision, the conversion section 54 shifts its operation to Operation S9.

Operation S8: The conversion section 54 inverse-transforms the signal components YCbCr of each pixel in the image data by using the inverse transformation of the equation [1] to obtain values of the color components RGB. By locally smoothing the values of the color components RGB, it is possible to calculate local signal levels of the color components RGB. The ratios of the color noises included in the texture component D also vary depending on level differences among the color components.

For example, in a blue area close to the primary color in a screen, the signal level of the color component B becomes especially high. As a result, the color component B includes almost all the texture information of the blue area.

On the other hand, in such a blue area, the signal level of the color component R is extremely low. Therefore, the color component R includes little significant texture information and is mostly occupied by noises.

As described above, the ratios of the color noises included in the texture component D vary depending on the level differences among the color components. In order to make the ratios of the color noises equal, the weighting ratios are adjusted so that a color component with a lower signal level has a less contribution ratio to the texture component D.

For example, it can be inferred that the color noise ratio δR:δG:δB correlating with the level difference can be expressed by the following equation, where RGB are the local signal levels of the color components.

$$\delta R:\delta G:\delta B = GB:RB:RG \qquad [11]$$

In the equation [11], noise δR>>δB is estimated from the level difference R<<B.

By using the equation [11] instead of the equation [3] used at Operation S5, the following simultaneous equations for αβ are obtained, $$(0.3313t1-0.1687)\alpha+(0.4187t1+0.5)\beta=0.587t1-0.299$$

$$(0.3313t2+0.5)\alpha+(0.4187t2-0.813)\beta=0.587t2-0.114 \qquad [12]$$

where t1=R/G and t2=B/G. Note that lower limit values of R, G, and B are limited so as not to become zero.

The solutions α, β of the equations [12] are weighting ratios α, β in which the level differences among the color components are taken into consideration. The conversion section 54 calculates the solutions α, β for each area of the image data. After calculating all the weighting ratios α, β for the respective local areas, the conversion section 54 shifts its operation to Operation S9.

Operation S9: The conversion section 54 weightedly adds the color difference fluctuations δCr, δCb to the brightness fluctuation δY according to the weighting ratios α, β decided at any of Operations S5~S8, and calculate the texture component D by the following equation.

$$\text{Texture component } D = \delta Y + \alpha\delta Cb + \beta\delta Cr \qquad [2]$$

Operation S10: The addition section 55 adds the texture component D multiplied by a predetermined addition coefficient to the brightness information resulting from the smoothing (or the brightness information Y of the image data).

The brightness fluctuation δY has been amplitude-modulated in proportion to a tone conversion coefficient (gradient of a tone conversion curve) of the brightness information Y. Therefore, if the texture component D multiplied by a fixed addition coefficient is added to the brightness information, excessive texture and noise tend to occur in an image area with a large tone conversion coefficient. Therefore, by adjusting, locally or on a per pixel basis, the addition coefficient in substantially inverse proportion to the tone conversion coefficient, the addition of the texture component D can be performed properly.

(Effect and so on of the Embodiment)

FIG. 3[C] is an image to which texture emphasis is applied by using only the brightness fluctuation δY (weighting ratios for the color difference fluctuations α=0, β=0). In this case, as the degree of the texture emphasis is increased, image noise prominently increases, resulting in an image having a noisy impression.

Further, FIG. 3[D] is an image to which the texture emphasis is applied with the weighting ratios α, β being set equal (α=β=0.27). In this case, the texture after the correction becomes richer than that in FIG. 3[C] by a degree corresponding to the texture emphasis using the color difference fluctuations. However, since a specific color noise is mixed in the brightness information due to the texture correction, a noisy impression is given to this image, though not so great as that in FIG. 3[C].

FIG. 3[E] is an image resulting from the processing in which the ratios of the color noises of the color components included in the texture component D are made substantially equal (α=0.45, β=0.09) as in the above-described first embodiment. In this case, since the ratio of a noise of R (red) included in the texture component D is moderately reduced, a noisy impression in a fabric portion (blue) is successfully reduced.

Embodiment

That is another embodiment of an electronic camera.

Figure 4:
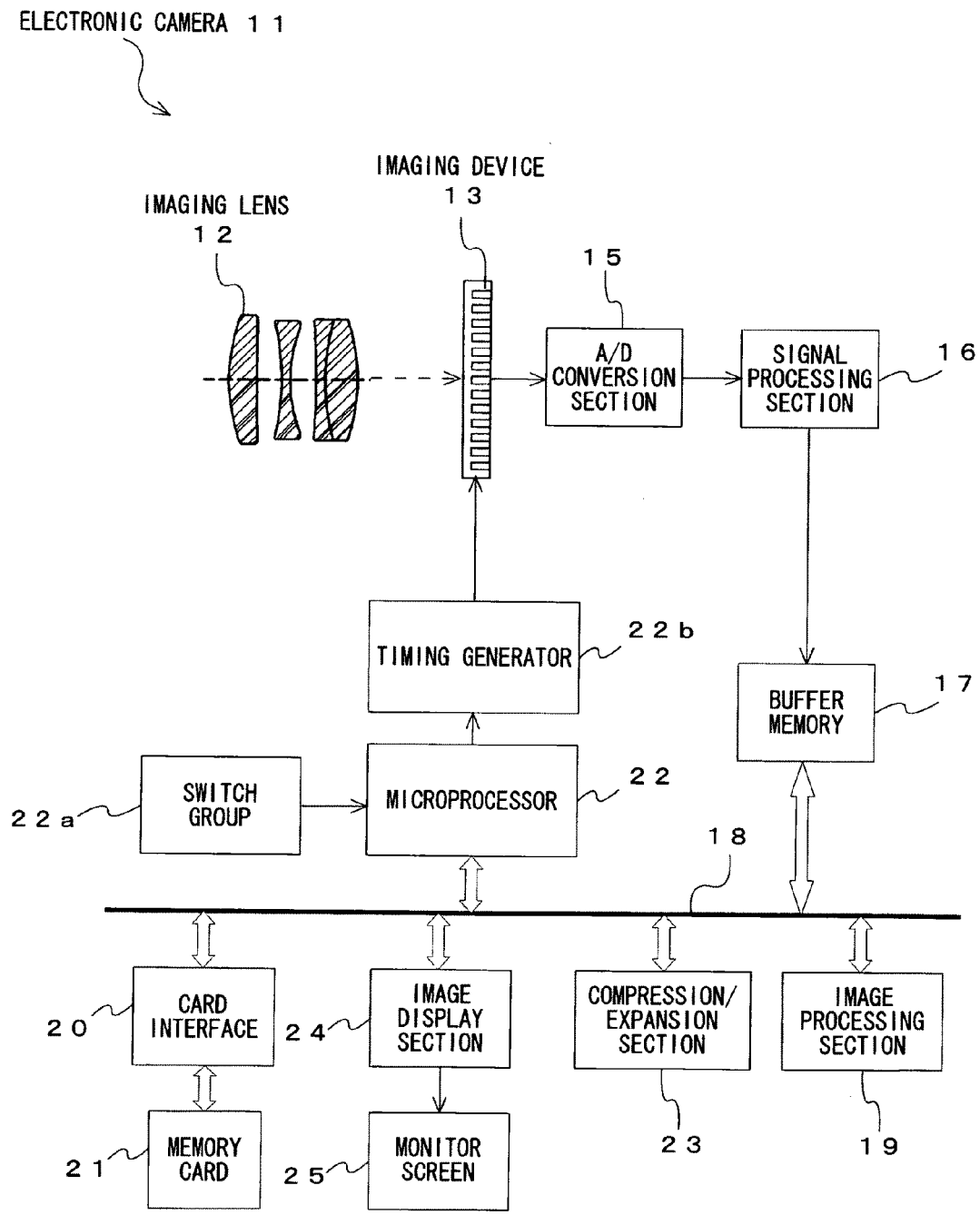
FIG. 4 is a block diagram showing the structure of an electronic camera 11.

FIG. 4 is a block diagram showing the structure of an electronic camera 11.

In FIG. 4, an imaging lens 12 is mounted in the electronic camera 11. In an image space of the imaging lens 12, a light-receiving surface of an imaging device 13 is disposed. The operation of the imaging device 13 is controlled by an output pulse of a timing generator 22b.

An image generated by the imaging device 13 is temporarily stored in a buffer memory 17 via an A/D conversion section 15 and a signal processing section 16.

The buffer memory 17 is coupled to a bus 18. To the bus 18, an image processing section 19, a card interface 20, a microprocessor 22, a compression/expansion section 23, an image display section 24 are coupled. Among these, the card interface 20 reads/writes data to/from a removable memory card 21. Further, a signal corresponding to a user's operation is input to the microprocessor 22 from a switch group 22a of the electronic camera 11. Further, the image display section 24 displays an image on a monitor screen 25 provided on a rear surface of the electronic camera 11.

In the electronic camera 11 as structured above, the texture correction of the first embodiment is executed by the microprocessor 22 and the image processing section 19.

This texture correction may be applied to image data immediately after the shooting or may be applied later to the image data recorded in the memory card 21.

<Supplementary Items to Embodiments>

The above embodiments describe the case where the texture emphasis is executed by using the image processing apparatus 51 or the electronic camera 11. However, the present embodiment is not limited to this. For example, an image processing server on the Internet may provide, as service, the image processing method for the texture correction to image data transmitted from a user.

The above embodiments describe the case where the texture correction is executed in the YCbCr color space. However, the present embodiment is not limited to this. For example, the similar texture correction may be executed in the Lab color space, the HSV color space, or other color space.

The above embodiments describe the case where the texture emphasis is applied to the whole screen. However, the present embodiment is not limited to this. For example, the texture emphasis may be applied only to part of a screen (a main subject, a figure or skin-color area, a shaded part, a trimming range, a background part except a figure and skin-color area, and the like). In this case, it is possible to effectively emphasize the texture of a specific part in the screen while avoiding an adverse effect of noise increase on the whole screen.

Further, in the above embodiment, it is preferable to output the color difference information after it is smoothed and output the result of the addition of the texture component D to the smoothed brightness information. However, the embodiment is not limited to this. For example, the smoothed color difference information may be obtained by subtracting the color difference fluctuation from the original color difference information. Further, for example, by subtracting the brightness fluctuation after adding the texture component to the original brightness information, it is possible to obtain brightness information with corrected texture.

In the above embodiment, one of Operations S5~S8 is selectively executed to decide the weighting ratios α, β. However, the embodiment is not limited to this. For example, a plurality of operations out of Operations S5~S8 may be executed to decide a plurality of kinds of weighting ratios. In this case, by taking an average or a weighted average of the plural kinds of weighting ratios, it is possible to calculate the weighting ratios α, β in which the equalization of a plurality of kinds of noises is taken into consideration.

It should be noted that the present embodiment can be implemented in other various forms without departing from its spirit and main features. Therefore, the above-described embodiments are only examples in all respects and should not be interpreted limitedly. The scope of the present embodiment is to be specified by the scope of the claims, and is in no way limited by the description in the specification. Further, modifications and alterations belonging to the scope equivalent to the scope of the claims are all embraced in the scope of the present embodiment.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claims is:

1. An image processing apparatus comprising:
a brightness fluctuation extraction section extracting a brightness fluctuation from a difference between brightness information in an image data and smoothed image data which is said image data being smoothed;

a color difference fluctuation extraction section extracting a color difference fluctuation from a difference between color difference information in said image data and said smoothed image data;

a conversion section weightedly adding said color difference fluctuation to said brightness fluctuation so as to generate a pseudo texture component; and an addition section adding said texture component to said brightness information in said smoothed image data, wherein said conversion section adjusts and changes a weighting ratio of said weighted addition and weightedly adds said color difference fluctuation to said brightness fluctuation so as to make ratios of color noises of color components included in said texture component substantially equal.

2. The image processing apparatus according to claim 1, wherein said conversion section obtains, as information, white balance coefficients used when said image data is generated, and calculates said weighting ratio for making said ratios of color noises correlating with said white balance coefficients equal.

3. The image processing apparatus according to claim 1, wherein based on local signal levels of color components of said image data, said conversion section locally calculates the weighting ratio for making ratios of level-dependent color noises included in said texture component equal.

4. The image processing apparatus according to claim 1, wherein said conversion section obtains, as information, color correction coefficients of said image data, and calculates said weighting ratio for making said ratios of color noises correlating with said color correction coefficients equal.

5. The image processing apparatus according to claim 1, wherein based on a level difference between local color components of said image data, said conversion section calculates said weighting ratio for making said ratios of color noises correlating with said level difference equal.

6. The image processing apparatus according to claim 1, wherein said addition section obtains, as information, a tone correction coefficient of said image data, and changes an addition coefficient of said texture component based on said tone correction coefficient.

7. A non-transitory computer readable medium storing an image processing program, causing a computer to function as the image processing apparatus according to claim 1.

8. An image processing method of applying image processing to image data including brightness information and color difference information, the method comprising:

extracting a brightness fluctuation from a difference between said brightness information in said image data and smoothed image data which is said image data being smoothed;

extracting a color difference fluctuation from a difference between said color difference information in said image data and said smoothed data;

weightedly adding said color difference fluctuation to said brightness fluctuation so as to generate a pseudo texture component; and adding said texture component to said brightness information in said smoothed image data, wherein;

said weightedly adding and generating operation adjusts and changes a weighting ratio of said weighted addition and weightedly adds said color difference fluctuation to said brightness fluctuation so as to make ratios of noises of color components included in said texture component substantially equal.

9. An electronic camera comprising:

the image processing apparatus according to claim 1; and an imaging section picking up an image of a subject to generate image data, wherein said image processing apparatus applies image processing to the image data generated by said imaging section.

10. An image processing apparatus comprising:

a brightness fluctuation extraction section extracting a brightness fluctuation from brightness information in an image data;

a color difference fluctuation extraction section extracting a color difference fluctuation from color difference information in said image data;

a conversion section weightedly adding said color difference fluctuation to said brightness fluctuation so as to generate a pseudo texture component; and an addition section adding said texture component to said brightness information, wherein said conversion section adjusts and changes a weighting ratio of said weighted addition so as to make ratios of color noises of color components included in said texture component substantially equal, and said conversion section obtains, as information, white balance coefficients used when said image data is generated, and calculates said weighting ratio for making said ratios of color noises correlating with said white balance coefficients equal.

* * * * *